(12) United States Patent
Chen et al.

(10) Patent No.: US 8,957,660 B2
(45) Date of Patent: Feb. 17, 2015

(54) CURRENT BALANCE CIRCUIT AND MULTIPHASE DC-DC CONVERTER AND CURRENT BALANCE METHOD THEREOF

(75) Inventors: Ke-Horng Chen, Hsinchu (TW); Yueh-Lung Kuo, New Taipei (TW); Chih-Heng Su, Hsinchu (TW); Yi-Ping Su, New Taipei (TW); Yu-Ping Huang, Changhua County (TW); Yu-Huei Lee, New Taipei (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 308 days.

(21) Appl. No.: 13/610,792

(22) Filed: Sep. 11, 2012

(65) Prior Publication Data

US 2013/0293203 A1  Nov. 7, 2013

(30) Foreign Application Priority Data

May 7, 2012  (TW) ............................. 101116168 A

(51) Int. Cl.
*G05F 1/00* (2006.01)
(52) U.S. Cl.
USPC .............................. 323/288; 323/272; 363/65
(58) Field of Classification Search
USPC ......... 323/242, 272, 288; 363/65, 74, 80, 123
See application file for complete search history.

(56) References Cited

U.S. PATENT DOCUMENTS

| 7,696,734 | B2 * | 4/2010 | Endo et al. ................... 323/272 |
| 7,923,977 | B2 * | 4/2011 | Huang .......................... 323/271 |
| 2007/0013356 | A1 * | 1/2007 | Qiu et al. ..................... 323/288 |
| 2007/0109825 | A1 * | 5/2007 | Qiu et al. ....................... 363/41 |
| 2011/0133704 | A1 * | 6/2011 | Zambetti et al. ............. 323/212 |

FOREIGN PATENT DOCUMENTS

TW            201007411           2/2010

* cited by examiner

*Primary Examiner* — Jue Zhang
*Assistant Examiner* — Lakaisha Jackson
(74) *Attorney, Agent, or Firm* — Winston Hsu; Scott Margo

(57) ABSTRACT

The present invention discloses a current balance circuit for a multiphase DC-DC converter. The current balance circuit comprises a current error calculation circuit, for generating a plurality of current balance signals indicating imbalance levels of a plurality of inductor currents of a plurality of channels of the multiphase DC-DC converter according to a plurality of current sensing signals of the plurality of channels, a time shift circuit, for adjusting pulse widths of a plurality of clock signals according to the plurality of current balance signals, and a ramp generator, for deciding shift levels of a plurality of ramp signals according to the plurality of clock signals.

12 Claims, 14 Drawing Sheets

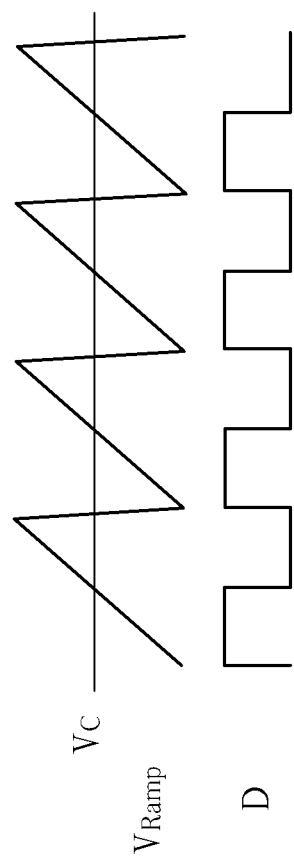

CURRENT BALANCE CIRCUIT AND MULTIPHASE DC-DC CONVERTER AND CURRENT BALANCE METHOD THEREOF

BACKGROUND OF THE INVENTION

1. Field of the Invention

The present invention relates to a current balance circuit and a multiphase DC-DC converter and a current balance method thereof, and more particularly, to a current balance circuit and a multiphase DC-DC converter and a current balance method thereof capable of shifting a time of starting to increase a voltage of a ramp signal to perform the current balance, so as to maintain a slope and amplitude of the ramp signal to be constant to prevent a loop gain of the current balance technique from varying with output and input voltages.

2. Description of the Prior Art

With the electronic products developing rapidly, requirements for specification on power management chips of the electronic products become more rigorous, especially on those for the microprocessors with high performance. In addition to high efficiency, the power management chips are also required to have an extreme high current driving capability and low ripples on the output voltage. In comparison with the conventional single channel DC-DC converter, a multiphase DC-DC converter has multiple parallel channels, and can distribute currents equally to each channel to provide a larger current. Then the multiphase DC-DC converter subtracts the output voltage by a reference voltage to be amplified via an amplifier to generate a voltage error signal, which will be compared with ramp signals with multiphase to adjust the duty cycles of pulse width modulation signals to control the power transistors of each channel, so as to adjust the currents of each channel. As a result, the multi-channel can provide power with multiphase to a load simultaneously, and thus can reduce ripples on the output voltage by well controlling the power with multiphase. Therefore, the multiphase DC-DC converter is most suitable for the high quality power management chips.

However, since there may be mismatches between the power transistor, inductor, and controller in each channel and on the printed circuit board (PCB), such that the currents of each channel may be imbalance and unequal. In addition to efficiency reduction, when the imbalance is severe, most of the currents flow through the same channel, and hence heats cannot be dissipated and the channel will be burnt. Therefore, the conventional multiphase DC-DC converter still needs a current balance technique to make the currents equally distributed to each channel to avoid the above situation to occur.

In detail, the conventional current balance technique applied in the multiphase DC-DC converters detects magnitudes of the currents flowing through each channel and calculates the average current, and then subtracts the current flowing through each channel by the average current to obtain a difference between the current flowing through each channel and the average current, so as to generate a current error signal. In the conventional current balance technique, the above current error signal is added to a voltage error signal, and thus each channel is corresponding to a voltage error signal, which can be utilized for controlling the output voltage and correcting the imbalance of the current. However, since this method combines the output voltage regulating and the current balance control on a voltage error signal, the control is more complex.

On the other hand, regarding the conventional current balance technique of adjusting slopes (i.e. amplitudes) of ramp signals, please refer to FIG. 1A to FIG. 1C. FIG. 1A is a waveform diagram of not performing the current balance control, and FIG. 1B and FIG. 1C are waveform diagrams of increasing and reducing amplitudes of ramp signals to perform the current balance, respectively. As shown in FIG. 1A, in a channel of the multiphase DC-DC converter, when current of the channel and the average current of all channels are equal and the current balance control is not performed, a voltage error signal $V_C$ is directly compared with a ramp signal $V_{Ramp}$ to obtain a duty cycle D required in this channel for stabilizing the output voltage. On the other hand, as shown in FIG. 1B, when the current of the channel is greater than the average current, the current of the channel should be reduced to achieve the current balance, and thus the slope (i.e. amplitude) of the ramp signal $V_{Ramp}$ is increased according to the current error signal first, and then the ramp signal $V_{Ramp}$ is compared with the voltage error signal $V_C$ to reduce the duty cycle D, so as to reduce the current of the channel. On the contrary, as shown in FIG. 1C, when the current of the channel is less than the average current, the current of the channel should be increased to achieve the current balance, and thus the slope (i.e. amplitude) of the ramp signal $V_{Ramp}$ is reduced according to the current error signal first, and then the ramp signal $V_{Ramp}$ is compared with the voltage error signal $V_C$ to increase the duty cycle D, so as to increase the current of the channel. In such a situation, for the channels with different currents, the current balance technique can simply adjust the slopes (i.e. amplitudes) of the ramp signals according to the currents of the channels to achieve the current balance.

However, regarding the above current balance technique of adjusting the slopes (i.e. amplitudes) of the ramp signals, loop gain of the current balance may change with variation of the duty cycle D. In such a condition, when the input voltage is far greater than the output voltage, the loop gain of the current balance is low, and performance of the current balance is worse, e.g. when the voltage error signal $V_C$ is lower, the duty cycle D has less variation with the same degree of variation in the slope of the ramp signal $V_{Ramp}$; when the input voltage is close to the output voltage, the loop gain of the current balance is high, and performance of the current balance is better, e.g. when the voltage error signal $V_C$ is higher, the duty cycle D has greater variation with the same degree of variation in the slope of the ramp signal $V_{Ramp}$, but the system stability is worse. Thus, there is a need for improvement of the prior art.

SUMMARY OF THE INVENTION

It is therefore an objective of the present invention to provide a current balance circuit and a multiphase DC-DC converter and a current balance method thereof capable of shifting a time of starting to increase a voltage of a ramp signal to perform current balance, so as to maintain a slope and amplitude of the ramp signal to be constant to prevent a loop gain of the current balance technique from varying with output and input voltages.

The present invention discloses a current balance circuit for a multiphase DC-DC converter. The current balance circuit comprises a current error calculation circuit, for generating a plurality of current balance signals indicating imbalance levels of a plurality of inductor currents of a plurality of channels of the multiphase DC-DC converter according to a plurality of current sensing signals of the plurality of channels, a time shift circuit, for adjusting pulse widths of a plurality of clock signals according to the plurality of current balance signals, and a ramp generator, for deciding shift levels of a plurality of ramp signals according to the plurality of clock signals.

The present invention further discloses a multiphase DC-DC converter. The multiphase DC-DC converter comprises a plurality of channel, for outputting a plurality of inductor currents, a current sensing circuit, for detecting magnitudes of the plurality of inductor currents to generate a plurality of current sensing signals, and a current balance circuit, comprising a current error calculation circuit, for generating a plurality of current balance signals indicating imbalance levels of the plurality of inductor currents according to the plurality of current sensing signals, a time shift circuit, for adjusting pulse widths of a plurality of clock signals according to the plurality of current balance signals, and a ramp generator, for deciding shift levels of a plurality of ramp signals according to the plurality of clock signals.

The present invention further discloses a current balance method for a multiphase DC-DC converter. The current balance method comprises generating a plurality of current balance signals indicating imbalance levels of a plurality of inductor currents of a plurality of channels of the multiphase DC-DC converter according to a plurality of current sensing signals of the plurality of channels, adjusting pulse widths of a plurality of clock signals according to the plurality of current balance signals, and deciding shift levels of a plurality of ramp signals according to the plurality of clock signals.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1A a waveform diagram of not performing the current balance control.

DETAILED DESCRIPTION

Figure 1B:
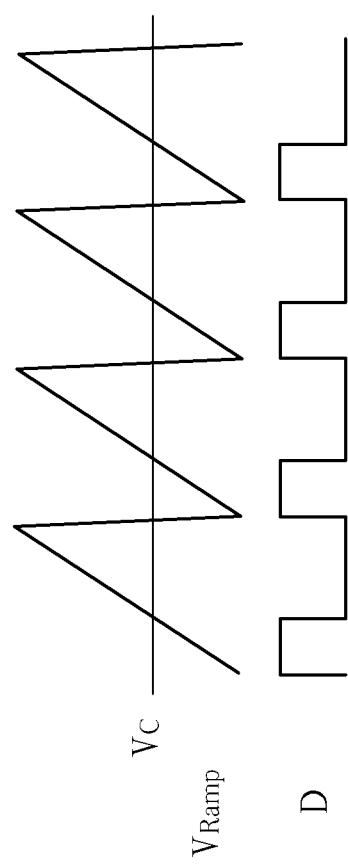
FIG. 1B and FIG. 1C are waveform diagrams with increasing and reducing amplitudes of ramp signals to perform the current balance, respectively.
Figure 1C:
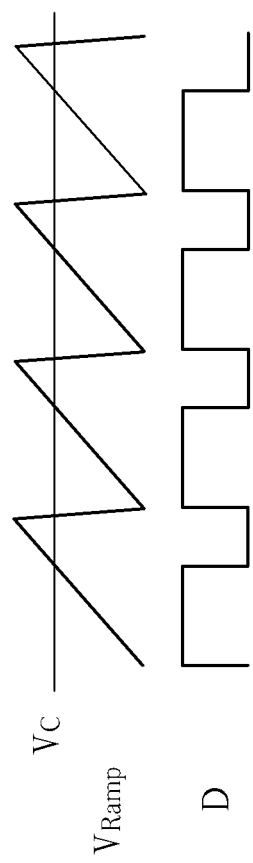
Figure 2:
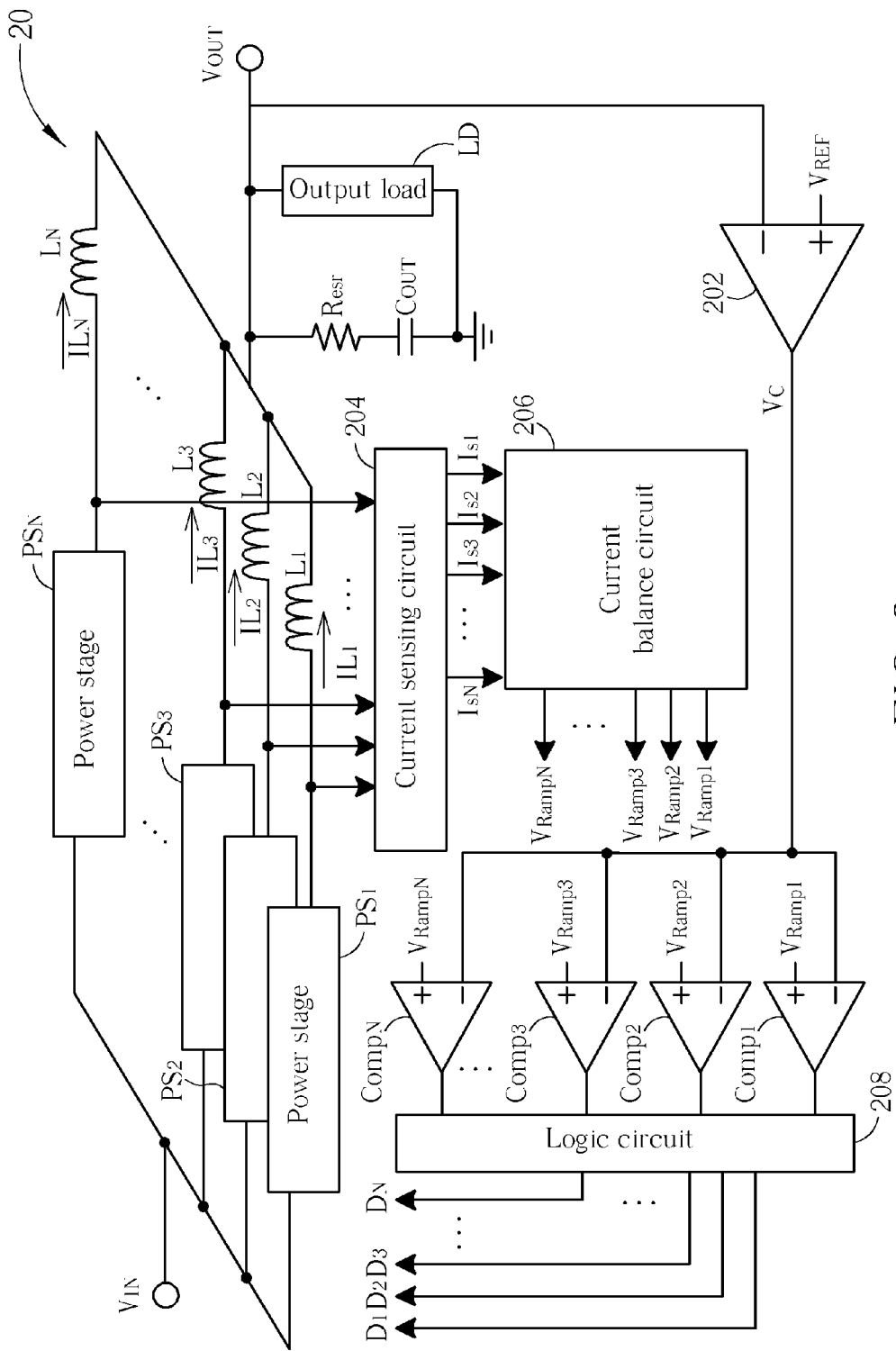
FIG. 2 is a schematic diagram of a multiphase DC-DC converter according to an embodiment of the present invention.

Please refer to FIG. 2, which is a schematic diagram of a multiphase DC-DC converter 20 according to an embodiment of the present invention. As shown in FIG. 2, the multiphase DC-DC converter 20 has N channels outputting inductor currents $IL_1$~$IL_N$ to an output load LD. The multiphase DC-DC converter 20 includes power stages $PS_1$~$PS_N$, an error amplifier 202, a current sensing circuit 204, a current balance circuit 206, comparators $Comp_1$~$Comp_N$, and a logic circuit 208.

In short, in the voltage-controlled multiphase DC-DC converter 20, each power stage among the power stages $PS_1$~$PS_N$ includes a high-side power transistor and a low-side power transistor, respectively, which can be turned on and off by means of pulse width modulation (PWM) according to duty cycles $D_1$~$D_N$, to charge a capacitor $C_{OUT}$ with an input voltage $V_{IN}$ through inductors $L_1$~$L_N$ and a resistor $R_{esr}$, so as to generate an output voltage $V_{OUT}$ for the output load LD. The error amplifier 202 amplifies a difference between the output voltage $V_{OUT}$ and a reference voltage $V_{REF}$ to generate a voltage error signal $V_C$ for the comparators $Comp_1$~$Comp_N$. Then the comparators $Comp_1$~$Comp_N$ compare the voltage error signal $V_C$ with N ramp signals $V_{Ramp1}$~$V_{RampN}$ with multiphase, i.e. voltage-controlled structure, such that the logic circuit 208 generates the duty cycles $D_1$~$D_N$ to control the high-side power transistor and the low-side power transistor by means of PWM. In such a situation, when the output voltage $V_{OUT}$ is deviated from a desired voltage level to cause the voltage error signal $V_C$ to vary, e.g. the output load LD varies, the duty cycles $D_1$~$D_N$ may vary accordingly to drive the output voltage $V_{OUT}$ back to the desired voltage level, so as to stabilize the output voltage $V_{OUT}$. The operation related to voltage stabilization is similar to the operation of the single channel DC-DC converter.

On the other hand, in order to ensure the currents flowing through each channel are equal, the current sensing circuit 204 detects magnitudes of the inductor currents $IL_1$~$IL_N$ flowing through each channel to generate current sensing signals $I_{s1}$~$I_{sN}$ indicating inductor current information in each channel for the current balance circuit 206, and then the current balance circuit 206 adjusts a time of starting to increase voltages of the N ramp signals $V_{Ramp1}$~$V_{RampN}$ with multiphase. Then the comparators $Comp_1$~$Comp_N$ compare the N ramp signals $V_{Ramp1}$~$V_{RampN}$ with multiphase with the voltage error signal $V_C$, such that the logic circuit 208 generates the different duty cycles $D_1$~$D_N$ to control the N channels, respectively. As a result, the present invention can shift the time of starting to increase the voltages of the ramp signals $V_{Ramp1}$~$V_{RampN}$ to perform the current balance, so as to maintain the slope of the ramp signals to be constant to prevent the loop gain of the current balance technique from varying with the output and input voltages.

Figure 3A:
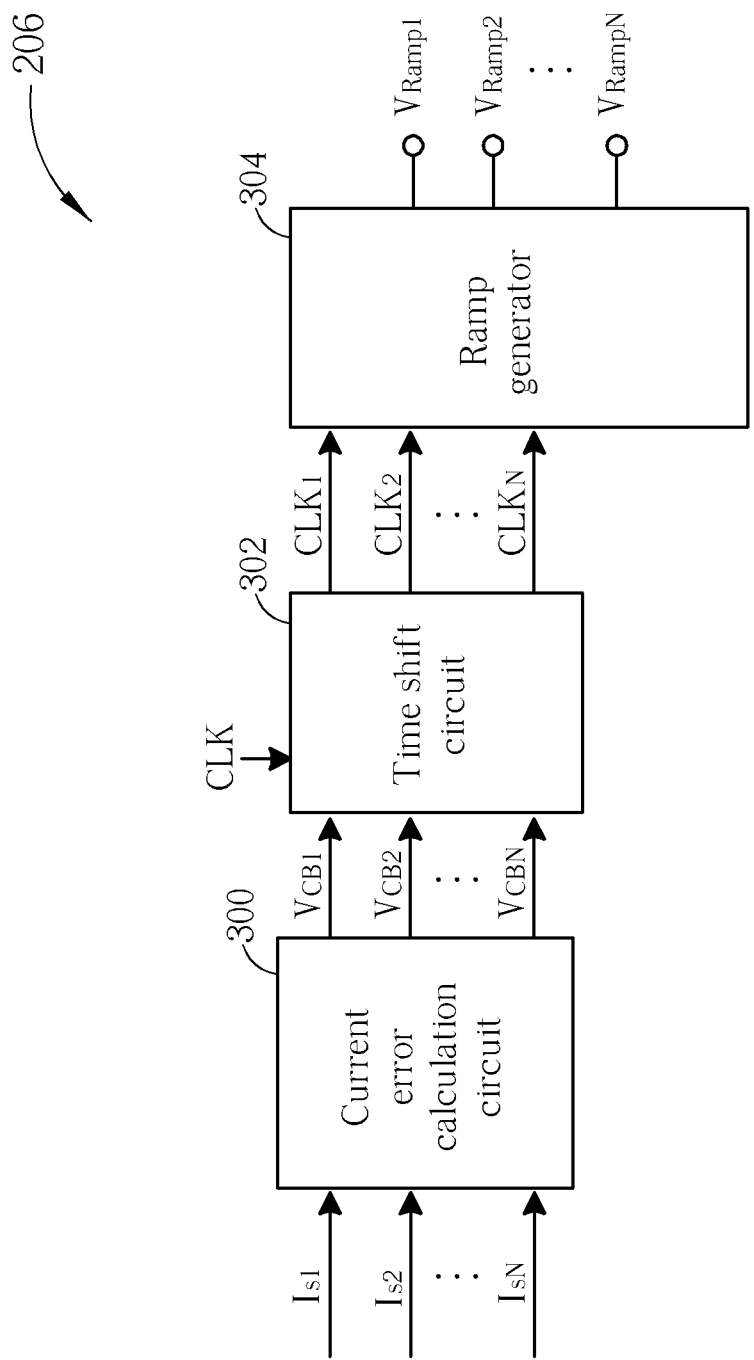
FIG. 3A is a schematic diagram of a current balance circuit shown in FIG. 2.

In detail, please refer to FIG. 3A, which is a schematic diagram of the current balance circuit 206 shown in FIG. 2. As shown in FIG. 3A, the current balance circuit 206 includes a current error calculation circuit 300, a time shift circuit 302, and a ramp generator 304. The current error calculation circuit 300 generates current balance signals $V_{CB1}$~$V_{CBN}$ indicating imbalance levels of the inductor currents $IL_1$~$IL_N$ according to the current sensing signals $I_{s1}$~$I_{sN}$, the time shift circuit 302 adjusts pulse widths of clock signals $CLK_1$~$CLK_N$ according to the current balance signals $V_{CB1}$~$V_{CBN}$ and a predefined clock signal CLK, and the ramp generator 304 decides shift levels (i.e. starting times) of the ramp signals $V_{Ramp1}$~$V_{RampN}$ according to the clock signals $CLK_1$~$CLK_N$, and then outputs the ramp signals $V_{Ramp1}$~$V_{RampN}$ to be compared with the voltage error signal $V_C$, so as to generate the duty cycles $D_1$~$D_N$.

Figure 3B:
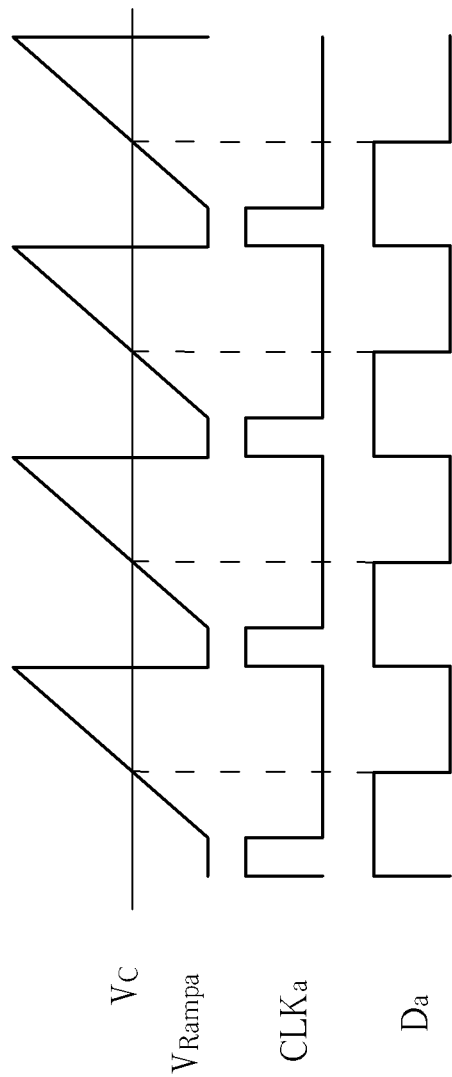
FIG. 3B is a waveform diagram of a current balance circuit shown in FIG. 3A not performing the current balance control.
Figure 3C:
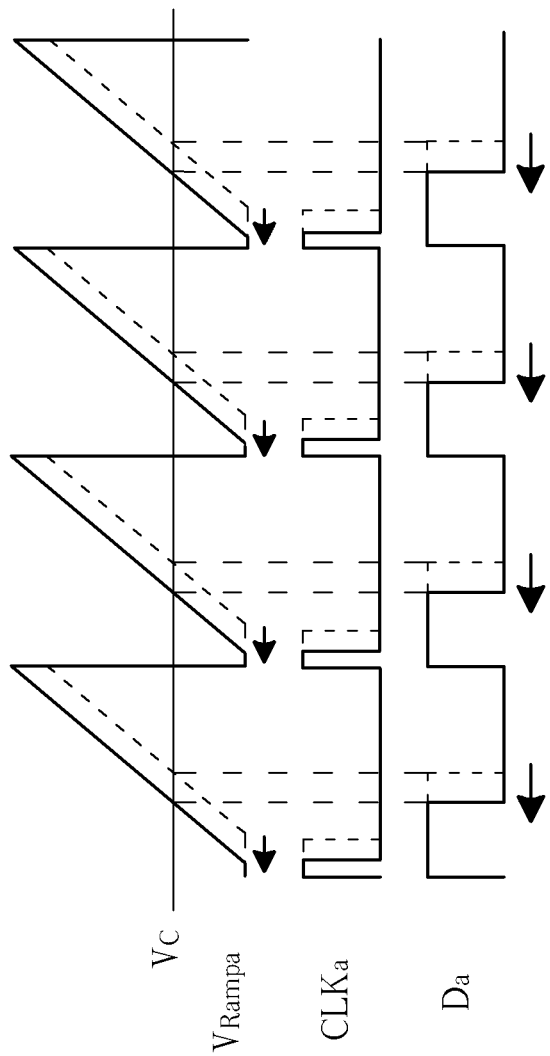
FIG. 3C and FIG. 3D are waveform diagrams of a current balance circuit shown in FIG. 3A advancing and delaying a time of starting to increase a voltage of a ramp signal to perform the current balance, respectively.
Figure 3D:
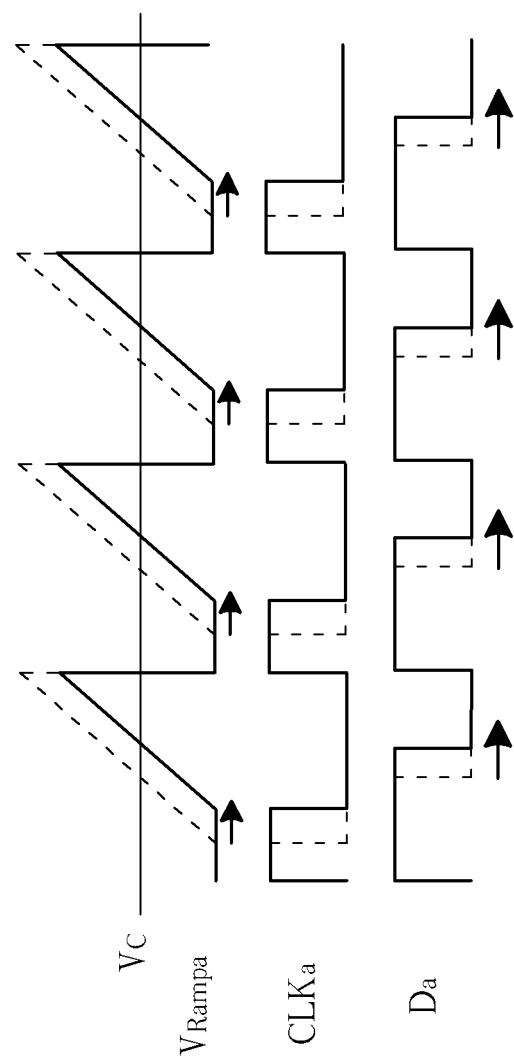

In such a situation, please refer to FIG. 3B to FIG. 3D. FIG. 3B is a waveform diagram of the current balance circuit 206 shown in FIG. 3A not performing the current balance control, and FIG. 3C and FIG. 3D are waveform diagrams of the current balance circuit 206 shown in FIG. 3A advancing and delaying the time of starting to increase the voltage of the ramp signal $V_{Rampa}$ to perform the current balance, respectively. As shown in FIG. 3B, in a channel (i.e. any one of the N channels) of the multiphase DC-DC converter 20, when an inductor current $IL_a$ of the channel is equal to an average current $IL_{avg}$ of the inductor currents $IL_1$~$IL_N$ of all channels and the current balance control is not performed, the ramp signal $V_{Rampa}$ is controlled by a clock signal $CLK_a$. That is, when the clock signal $CLK_a$ is high (i.e. logic "1"), the ramp signal $V_{Rampa}$ is maintained at a predefined voltage level; when the clock signal $CLK_a$ is low (i.e. logic "0"), the voltage of the ramp signal $V_{Rampa}$ increases with a fixed slope. As a result, the required duty cycle $D_a$ can be obtained by comparing the voltage error signal $V_C$ with the ramp signal $V_{Rampa}$, i.e. when the output voltage $V_{OUT}$ varies to cause the voltage error signal $V_C$ to vary, the duty cycle $D_a$ can vary accordingly to stabilize the output voltage $V_{OUT}$.

On the other hand, as shown in FIG. 3C, when the inductor current $IL_a$ of the channel is greater than the average current $IL_{avg}$, the current of this channel should be reduced to achieve the current balance. At this moment time, the time shift circuit 302 reduces the pulse width of the clock signal $CLK_a$, and the ramp generator 304 advances the time of starting to increase the voltage of the ramp signal $V_{Rampa}$ with a fixed slope, wherein the original ramp signal $V_{Rampa}$ is denoted by a dotted line, and the adjusted ramp signal $V_{Rampa}$ is denoted by a solid line. In such a situation, the duty cycle $D_a$ obtained by comparing the ramp signal $V_{Rampa}$ with the same voltage error signal $V_C$ may be reduced, and thus the current of this channel will be reduced accordingly.

On the contrary, as shown in FIG. 3D, when the inductor current $IL_a$ of the channel is less than the average current $IL_{avg}$, the current of this channel should be increased to achieve the current balance. At this moment time, the time shift circuit 302 increases the pulse width of the clock signal $CLK_a$, and the ramp generator 304 delays the time of starting to increase the voltage of the ramp signal $V_{Rampa}$ with a fixed slope, wherein the original ramp signal $V_{Rampa}$ is denoted by a dotted line, and the adjusted ramp signal $V_{Rampa}$ is denoted by a solid line. In such a situation, the duty cycle $D_a$ obtained by comparing the ramp signal $V_{Rampa}$ with the same voltage error signal $V_C$ may be increased, and thus the current of this channel will be increased accordingly. As a result, the present invention can shift the time of starting to increase the voltages of the ramp signals $V_{Ramp1}$~$V_{RampN}$ to perform the current balance for the voltage-controlled multiphase DC-DC converter 20.

Noticeably, the spirit of the present invention is to shift the time of starting to increase the voltages of the ramp signals $V_{Ramp1}$~$V_{RampN}$ to perform the current balance. Therefore, the slope of the ramp signals can be maintained as a constant to prevent the loop gain of the current balance technique from varying with the output and input voltages. Those skilled in the art can make modifications and alterations accordingly. For example, in the above embodiment, the ramp signal $V_{Rampa}$ is controlled by the clock signal $CLK_a$ to maintain at a predefined voltage level when the clock signal $CLK_a$ is high and to rise with a fixed slope when the clock signal $CLK_a$ is low. However, in other embodiments, the ramp signal $V_{Rampa}$ can also be controlled by means of other methods. Besides, the above multiphase DC-DC converter 20 is voltage-controlled, and hence the comparators $Comp_1$~$Comp_N$ compare the voltage error signal $V_C$ with the ramp signals $V_{Ramp1}$~$V_{RampN}$ to generate the duty cycles $D_1$~$D_N$. Although the voltage control is easier, the system bandwidth is smaller and the transient response is slower. Therefore, in other embodiments, the multiphase DC-DC converter 20 may also be current-controlled. Although the current control is more complex, the system bandwidth is larger and the transient response will be faster. Note that the elements should be modified and alternated accordingly.

Figure 4A:
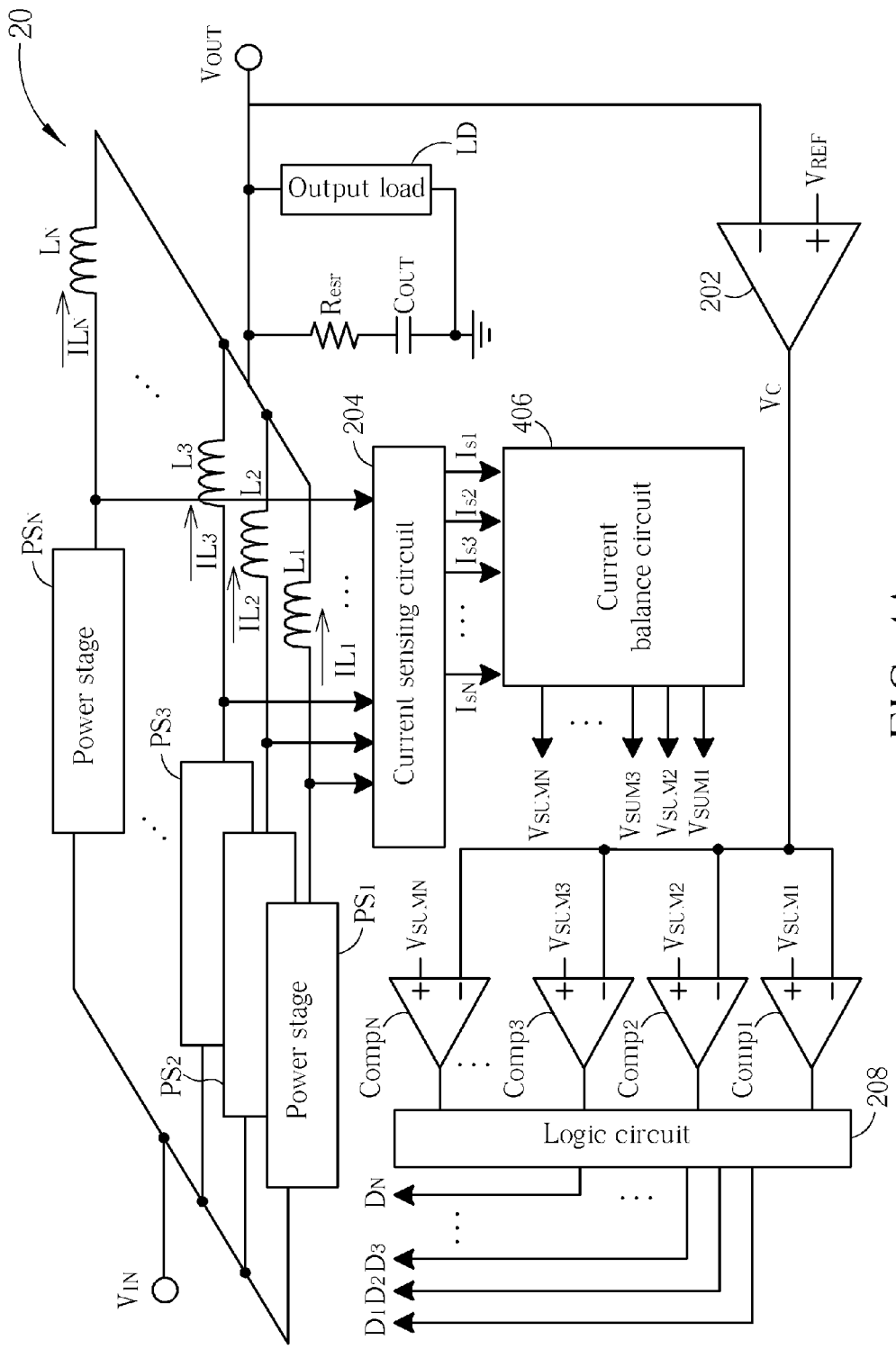
FIG. 4A is a schematic diagram of a multiphase DC-DC converter according to an embodiment of the present invention.

In detail, please refer to FIG. 4A, which is a schematic diagram of a multiphase DC-DC converter 40 according to an embodiment of the present invention. The multiphase DC-DC converter 40 is similar to the multiphase DC-DC converter 20, and hence elements and signals with similar functions are denoted by the same symbols. The main difference between the multiphase DC-DC converter 40 and the multiphase DC-DC converter 20 is that the multiphase DC-DC converter 40 is current-controlled. Therefore, the duty cycles $D_1$~$D_N$ is not derived from the voltage error signal $V_C$ and the ramp signals $V_{Ramp1}$~$V_{RampN}$, but is derived from the voltage error signal $V_C$ and peak values of the inductor currents $IL_1$~$IL_N$. Since the current-controlled DC-DC converter 40 needs to perform slope compensation to avoid sub-harmonic oscillation, a current balance circuit 406 of the multiphase DC-DC converter 40 shifts the time of starting to increase the voltage of the ramp signals $V_{Ramp1}$~$V_{RampN}$, and then adds the ramp signals $V_{Ramp1}$~$V_{RampN}$ with the current sensing signals $I_{s1}$~$I_{sN}$ to output summation signals $V_{SUM1}$~$V_{SUMN}$ to be compared with the voltage error signal $V_C$, so as to generate the duty cycles $D_1$~$D_N$, i.e. the ramp signals $V_{Ramp1}$~$V_{RampN}$ have the functions of both the slope compensation and the current balance.

Figure 4B:
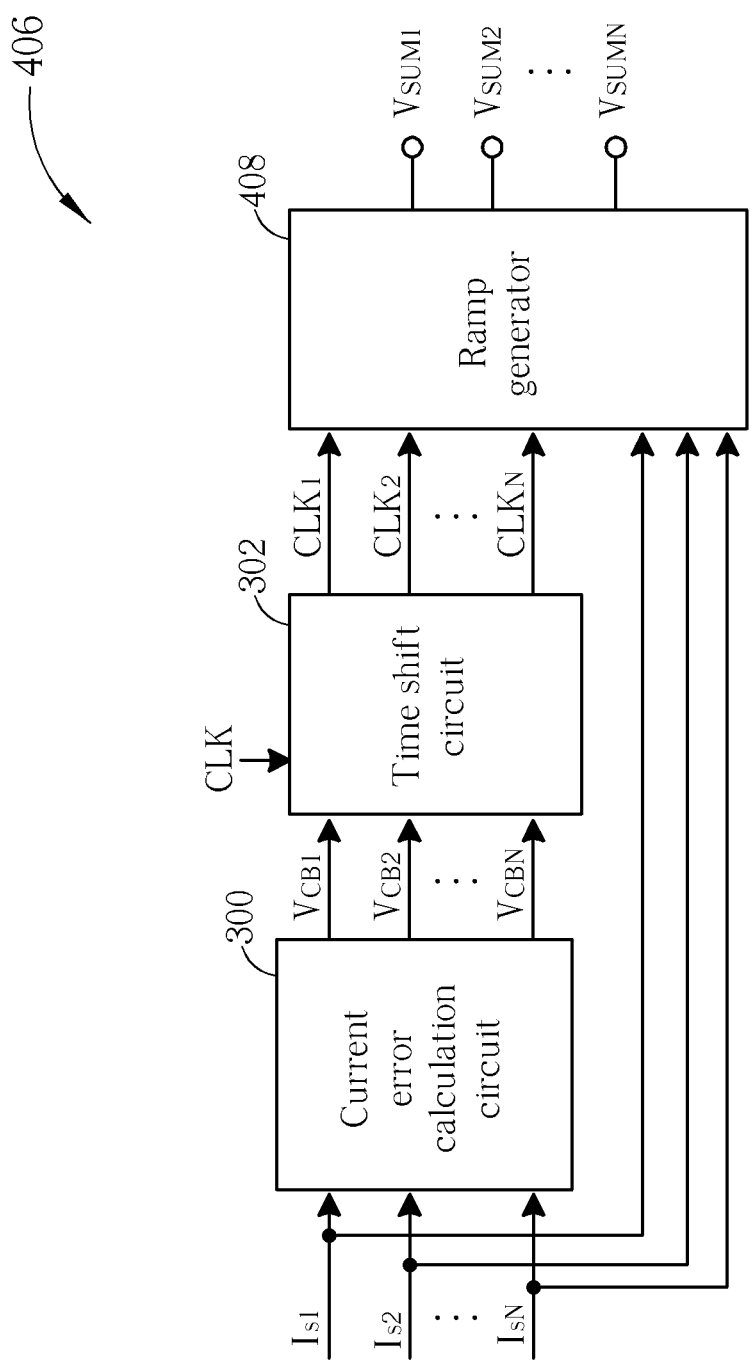
FIG. 4B is a schematic diagram of a current balance circuit shown in FIG. 4A.

Therefore, please refer to FIG. 4B, which is a schematic diagram of the current balance circuit 406 shown in FIG. 4A. The current balance circuit 406 shown in FIG. 4B and the current balance circuit 206 shown in FIG. 3A are similar, and hence elements and signals with similar functions are denoted by the same symbols. The main difference between the current balance circuit 406 shown in FIG. 4B and the current balance circuit 206 shown in FIG. 3A is that a ramp generator 408 of the current balance circuit 406 adds the ramp signals $V_{Ramp1}$~$V_{RampN}$ with the current sensing signals $I_{s1}$~$I_{sN}$ to output the summation signals $V_{SUM1}$~$V_{SUMN}$.

Figure 4C:
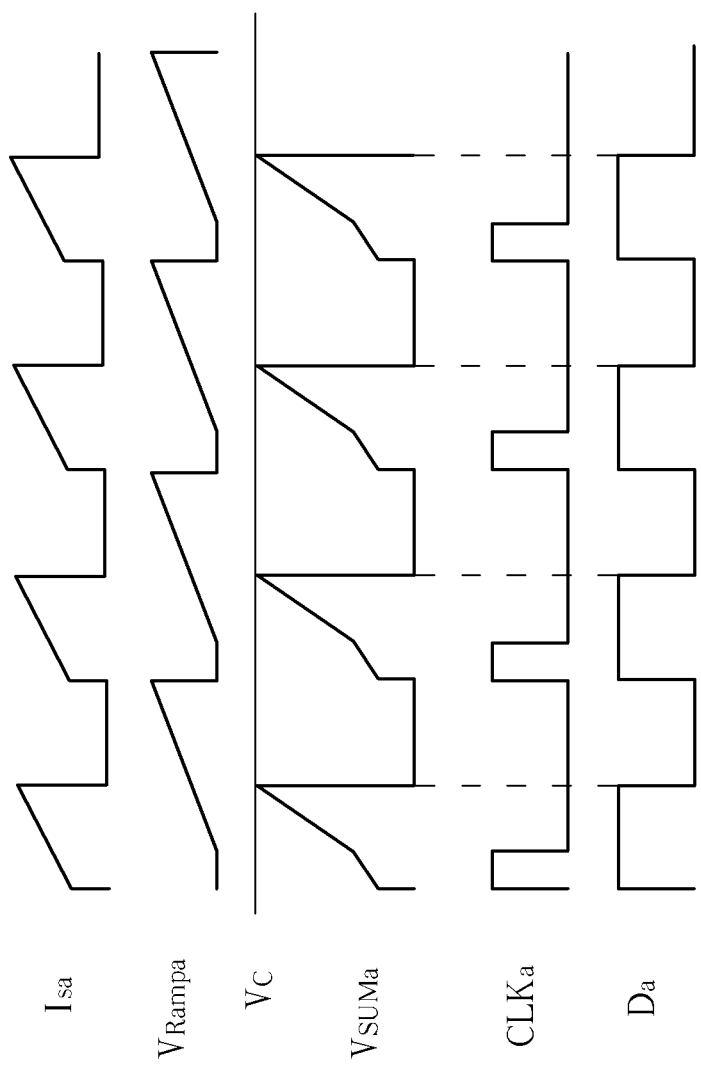
FIG. 4C is a waveform diagram of a current balance circuit shown in FIG. 4B not performing the current balance control.
Figure 4D:
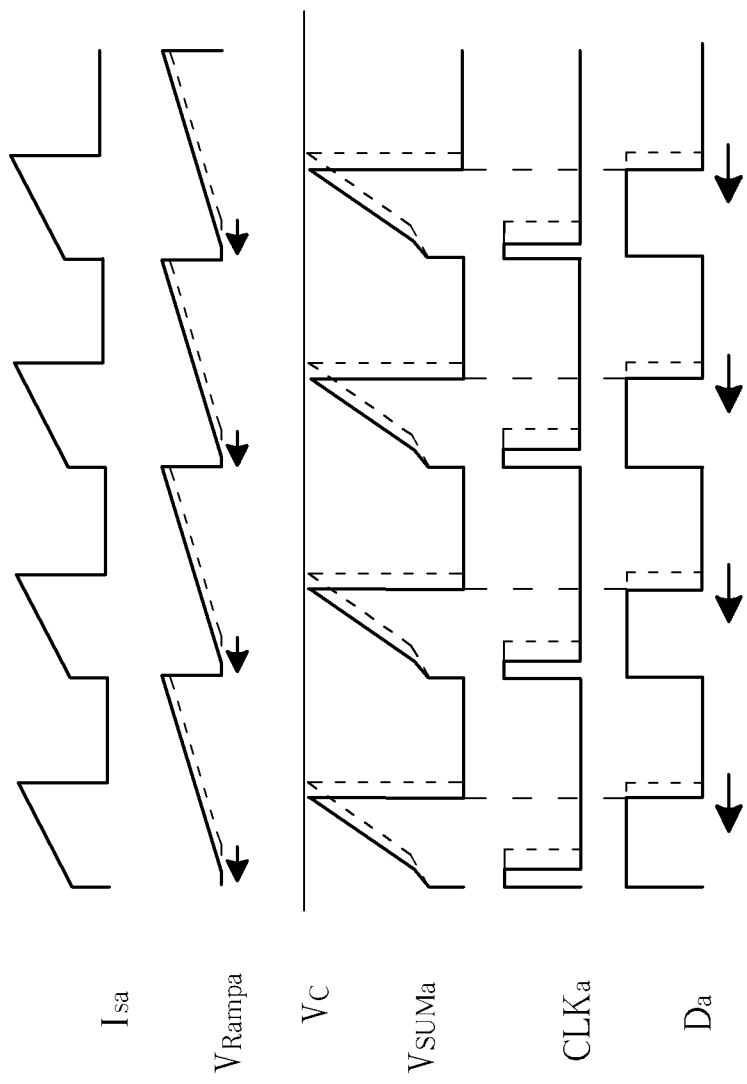
FIG. 4D and FIG. 4E are waveform diagrams of a current balance circuit shown in FIG. 4B advancing and delaying a time of starting to increase a voltage of a ramp signal to perform the current balance, respectively.
Figure 4E:
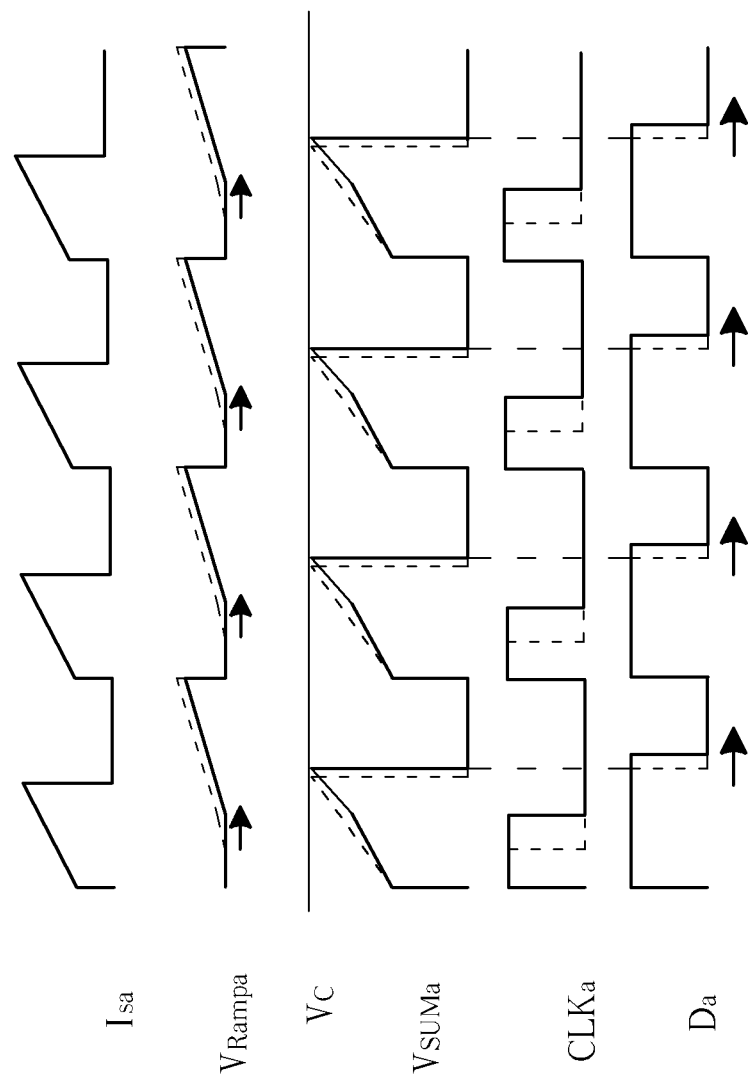

In such a situation, please refer to FIG. 4C to FIG. 4E. FIG. 4C is a waveform diagram of the current balance circuit 406 shown in FIG. 4B not performing the current balance control, and FIG. 4D and FIG. 4E are waveform diagrams of the current balance circuit 406 shown in FIG. 4B advancing and delaying the time of starting to increase the voltage of the ramp signal $V_{Rampa}$ to perform the current balance, respectively. As shown in FIG. 4C, in a channel (i.e. any one of the N channels) of the multiphase DC-DC converter 40, when an inductor current $IL_a$ in the channel is equal to an average current $IL_{avg}$ of the inductor currents $IL_1$~$IL_N$ of all channels and the current balance control is not performed, the current balance circuit 406 adds the ramp signal $V_{Rampa}$ with the current sensing signal $I_{sa}$ to generate the summation signal $V_{SUMa}$, and then the voltage error signal $V_C$ is compared with the summation signal $V_{SUMa}$, so as to obtain the required duty cycle $D_a$, i.e. when the output voltage $V_{OUT}$ varies to cause the voltage error signal $V_C$ to vary, the duty cycle $D_a$ can vary accordingly to stabilize the output voltage $V_{OUT}$.

On the other hand, as shown in FIG. 4C, when the inductor current $IL_a$ of the channel is greater than the average current $IL_{avg}$, the current of this channel should be reduced to achieve the current balance. At this moment time, the time shift circuit 302 reduces the pulse width of the clock signal $CLK_a$, and the ramp generator 304 advances the time of starting to increase the voltage of the ramp signal $V_{Rampa}$ with a fixed slope, wherein the original ramp signal $V_{Rampa}$ is denoted by a dotted line, and the adjusted ramp signal $V_{Rampa}$ is denoted by a solid line. In such a situation, the duty cycle $D_a$ obtained by adding the ramp signal $V_{Rampa}$ with the current sensing signal $I_{sa}$ to generate the summation signal $V_{SUMa}$ to be compared with the same voltage error signal $V_C$ may be reduced, and thus the current of this channel will be reduced accordingly.

On the contrary, as shown in FIG. 4D, when the inductor current $IL_a$ of the channel is less than the average current $IL_{avg}$, the current of this channel should be increased to achieve the current balance. At this moment time, the time shift circuit 302 increases the pulse width of the clock signal $CLK_a$, and the ramp generator 304 delays the time of starting to increase the voltage of the ramp signal $V_{Rampa}$ with a fixed slope, wherein the original ramp signal $V_{Rampa}$ is denoted by a dotted line, and the adjusted ramp signal $V_{Rampa}$ is denoted by a solid line. In such a situation, the duty cycle $D_a$ obtained by adding the ramp signal $V_{Rampa}$ with the current sensing signal $I_{sa}$ to generate the summation signal $V_{SUMa}$ to be compared with the same voltage error signal $V_C$ may be increased, and thus the current of this channel will be increased accordingly. As a result, the present invention can shift the time of starting to increase the voltages of the ramp signals $V_{Ramp1} \sim V_{RampN}$ to perform the current balance for the current-controlled multiphase DC-DC converter 40.

Figure 5:
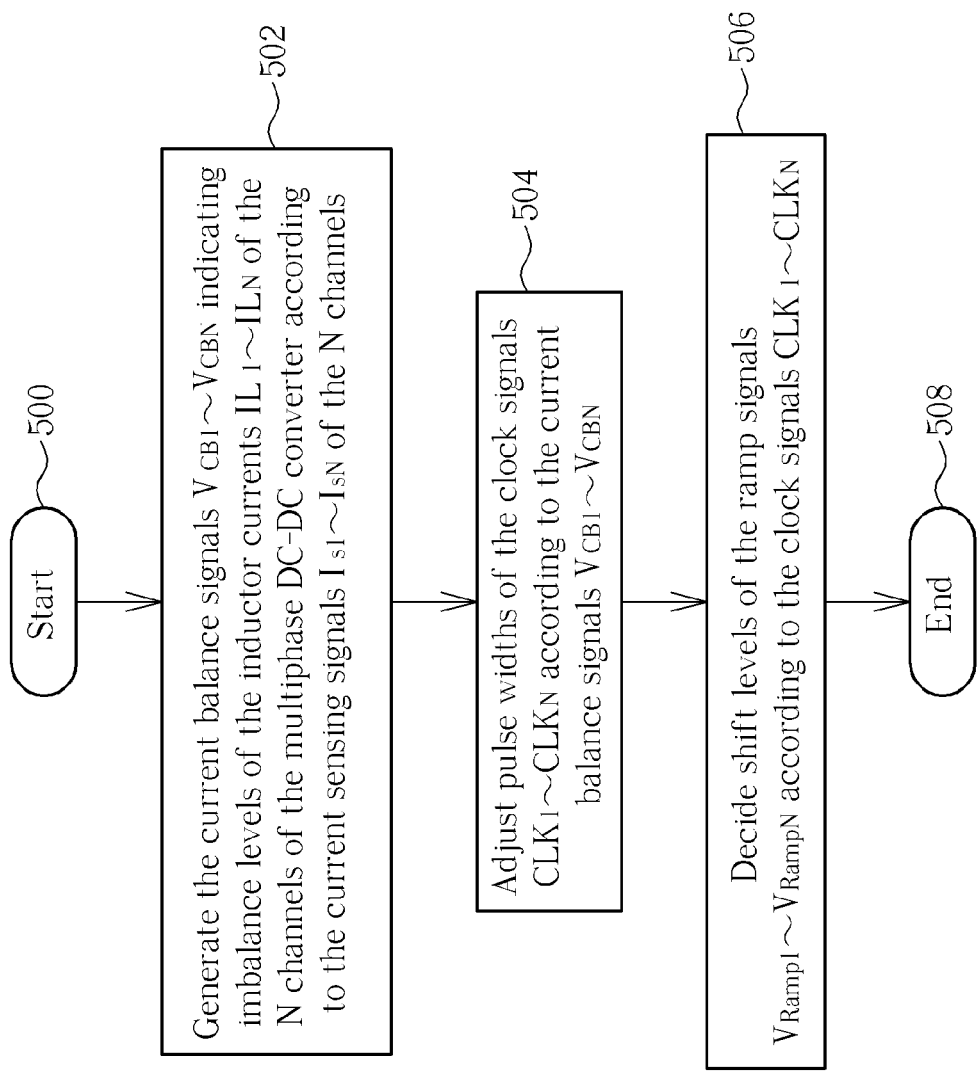
FIG. 5 is a schematic diagram of a current balance process according to an embodiment of the present invention.

The operation of the above current balance circuits 206 and 406 can be summarized into a current balance process 50. As shown in FIG. 5, the current balance process 50 includes the following Steps:

Step 500: Start.

Step 502: Generate the current balance signals $V_{CB1} \sim V_{CBN}$ indicating imbalance levels of the inductor currents $IL_1 \sim IL_N$ of the N channels of the multiphase DC-DC converter according to the current sensing signals $I_{s1} \sim I_{sN}$ of the N channels.

Step 504: Adjust pulse widths of the clock signals $CLK_1 \sim CLK_N$ according to the current balance signals $V_{CB1} \sim V_{CBN}$.

Step 506: Decide shift levels of the ramp signals $V_{Ramp1} \sim V_{RampN}$ according to the clock signals $CLK_1 \sim CLK_N$.

Step 508: End.

The detailed operation of the current balance process 50 can be referred to the above illustration, and will not be narrated hereinafter.

In the prior art, the method of adding the current error signal to the voltage error signal is to combine stabilizing control of the output voltage and the current balance control on the voltage error signal, and the control is more complex. On the other hand, regarding the current balance technique of adjusting slopes (i.e. amplitudes) of the ramp signals, since loop gain of the current balance may change with variation of the duty cycle D, when the input voltage is far greater than the output voltage, the loop gain of the current balance is low and performance of the current balance is worse, and when the input voltage is close to the output voltage, the loop gain of the current balance is high and performance of the current balance is better, but the system stability is worse.

In comparison, the present invention is capable of shifting the time of starting to increase the voltage of the ramp signal to perform the current balance, so as to maintain the slope of the ramp signal to be constant to prevent the loop gain of the current balance technique from varying with the output and input voltages. Therefore, the loop gain can be higher, and the system stability will not be influenced by the duty cycle.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A current balance circuit for a multiphase DC-DC converter, comprising:
    a current error calculation circuit, for generating a plurality of current balance signals indicating imbalance levels of a plurality of inductor currents of a plurality of channels of the multiphase DC-DC converter according to a plurality of current sensing signals of the plurality of channels;
    a time shift circuit, for adjusting pulse widths of a plurality of clock signals according to the plurality of current balance signals; and
    a ramp generator, for deciding shift levels of a plurality of ramp signals according to the plurality of clock signals;
    wherein when one of the plurality of inductor currents is greater than an average inductor current of the plurality of inductor currents, the time shift circuit reduces a pulse width of a corresponding clock signal among the plurality of clock signals, and the ramp generator advances a time of starting to increase a voltage of a corresponding ramp signal among the plurality of ramp signals with a fixed slope; or
    when one of the plurality of inductor currents is less than an average inductor current of the plurality of inductor currents, the time shift circuit increases a pulse width of a corresponding clock signal among the plurality of clock signals, and the ramp generator delays a time of starting to increase a voltage of a corresponding ramp signal among the plurality of ramp signals with a fixed slope.

2. The current balance circuit of claim 1, wherein when the plurality of clock signals are at a higher voltage level, the ramp generator maintains the plurality of ramp signals at a predefined voltage level, and when the plurality of clock signals are at a lower voltage level, the ramp generator increases voltages of the plurality of ramp signals with a fixed slope.

3. The current balance circuit of claim 1, wherein the multiphase DC-DC converter is voltage-controlled, and the ramp generator outputs the plurality of ramp signals to be compared with a voltage error signal, so as to generate a plurality of duty cycles.

4. The current balance circuit of claim 1, wherein the multiphase DC-DC converter is current-controlled, and the ramp generator adds the plurality of ramp signals with the plurality of current sensing signals respectively to output a plurality of summation signals to be compared with a voltage error signal, so as to generate a plurality of duty cycles.

5. A multiphase DC-DC converter, comprising:
    a plurality of channels, for outputting a plurality of inductor currents;
    a current sensing circuit, for detecting magnitudes of the plurality of inductor currents, to generate a plurality of current sensing signals; and
    a current balance circuit, comprising:
        a current error calculation circuit, for generating a plurality of current balance signals indicating imbalance levels of the plurality of inductor currents according to the plurality of current sensing signals;
        a time shift circuit, for adjusting pulse widths of a plurality of clock signals according to the plurality of current balance signals; and
        a ramp generator, for deciding shift levels of a plurality of ramp signals according to the plurality of clock signals;
        wherein when one of the plurality of inductor currents is greater than an average inductor current of the plurality of inductor currents, the time shift circuit reduces a pulse width of a corresponding clock signal among the plurality of clock signals, and the ramp generator advances a time of starting to increase a voltage of a corresponding ramp signal among the plurality of ramp signals with a fixed slope; or when one of the plurality of inductor currents is less than an average inductor current of the plurality of inductor currents, the time shift circuit increases a pulse width of a corresponding clock signal among the plurality of clock signals, and the ramp generator delays a time of starting to increase a voltage of a corresponding ramp signal among the plurality of ramp signals with a fixed slope.

6. The multiphase DC-DC converter of claim 5, wherein when the plurality of clock signals are at a higher voltage level, the ramp generator maintains the plurality of ramp signals at a predefined voltage level, and when the plurality of clock signals are at a lower voltage level, the ramp generator increases voltages of the plurality of ramp signals with a fixed slope.

7. The multiphase DC-DC converter of claim 5, wherein the multiphase DC-DC converter is voltage-controlled, and the ramp generator outputs the plurality of ramp signals to be compared with a voltage error signal, so as to generate a plurality of duty cycles.

8. The multiphase DC-DC converter of claim 5, wherein the multiphase DC-DC converter is current-controlled, and the ramp generator adds the plurality of ramp signals with the plurality of current sensing signals respectively to output a plurality of summation signals to be compared with a voltage error signal, so as to generate a plurality of duty cycles.

9. A current balance method for a multiphase DC-DC converter, comprising:

generating a plurality of current balance signals indicating imbalance levels of a plurality of inductor currents of a plurality of channels of the multiphase DC-DC converter according to a plurality of current sensing signals of the plurality of channels;

adjusting pulse widths of a plurality of clock signals according to the plurality of current balance signals; and deciding shift levels of a plurality of ramp signals according to the plurality of clock signals;

wherein when one of the plurality of inductor currents is greater than an average inductor current of the plurality of inductor currents, reduce a pulse width of a corresponding clock signal among the plurality of clock signals, and advance a time of starting to increase a voltage of a corresponding ramp signal among the plurality of ramp signals with a fixed slope; or when one of the plurality of inductor currents is less than an average inductor current of the plurality of inductor currents, increase a pulse width of a corresponding clock signal among the plurality of clock signals, and delay a time of starting to increase a voltage of a corresponding ramp signal among the plurality of ramp signals with a fixed slope.

10. The current balance method of claim 9, wherein when the plurality of clock signals are at a higher voltage level, maintain the plurality of ramp signals at a predefined voltage level, and when the plurality of clock signals are at a lower voltage level, increase voltages of the plurality of ramp signals with a fixed slope.

11. The current balance method of claim 9, further comprising outputting the plurality of ramp signals to be compared with a voltage error signal, so as to generate a plurality of duty cycles.

12. The current balance method of claim 9, further comprising adding the plurality of ramp signals with the plurality of current sensing signals respectively to output a plurality of summation signals to be compared with a voltage error signal, so as to generate a plurality of duty cycles.

* * * * *